(12) United States Patent
Mui et al.

(10) Patent No.: US 8,936,886 B2
(45) Date of Patent: Jan. 20, 2015

(54) METHOD FOR GENERATING SYNGAS FROM BIOMASS INCLUDING TRANSFER OF HEAT FROM THERMAL CRACKING TO UPSTREAM SYNGAS

(75) Inventors: Clifford Low Bor Mui, Burnaby (CA); Hendrick Vandergriendt, Surrey (CA); Dejan Sparica, North Vancouver (CA); Yan Li, Burnaby (CA)

(73) Assignee: Nexterra Systems Corp., Vancouver (CA)

( * ) Notice: Subject to any disclaimer, the term of this patent is extended or adjusted under 35 U.S.C. 154(b) by 221 days.

(21) Appl. No.: 13/000,627

(22) PCT Filed: Jun. 25, 2009

(86) PCT No.: PCT/CA2009/000866
§ 371 (c)(1),
(2), (4) Date: Jan. 17, 2011

(87) PCT Pub. No.: WO2009/155697
PCT Pub. Date: Dec. 30, 2009

(65) Prior Publication Data
US 2011/0104575 A1 May 5, 2011

Related U.S. Application Data

(60) Provisional application No. 61/075,685, filed on Jun. 25, 2008, provisional application No. 61/098,643, filed on Sep. 19, 2008.

(51) Int. Cl.
*H01M 8/06* (2006.01)
*C10J 3/20* (2006.01)
(Continued)

(52) U.S. Cl.
CPC ... *B09B 3/00* (2013.01); *C01B 3/36* (2013.01); *C01B 3/382* (2013.01); *C10G 2/32* (2013.01);
(Continued)

(58) Field of Classification Search
USPC ............... 429/401, 416, 426; 48/87, 197 R
See application file for complete search history.

(56) References Cited

U.S. PATENT DOCUMENTS 1,692,476 A * 11/1928 Wadsworth ............... 208/102
4,381,187 A * 4/1983 Sederquist ................. 48/212
(Continued)

FOREIGN PATENT DOCUMENTS

CA 1308910 10/1992
CA 2255218 6/1999
(Continued)

OTHER PUBLICATIONS

Brandt, R et al., "Decomposition of Tar in Gas From Updraft Gasifer by Thermal Cracking", 1st World Conference on Biomass for Energy and Industry, Sevilla, Spain Jun. 5-9, 2000, pp. 1756-1758.

*Primary Examiner* — Sean P Cullen
(74) *Attorney, Agent, or Firm* — Oyen Wiggs Green & Mutala LLP

(57) ABSTRACT

Biomass is gasified to generate syngas. The syngas is subjected to thermal cracking. Heat from syngas exiting a thermal cracking stage is transferred to syngas entering the thermal cracking stage. Biomass gasification apparatus may include a thermal pathway connected to transfer heat from an outlet of a thermal cracking process to an inlet of the thermal cracking process. Energy efficiency is enhanced. Syngas may be used as fuel for engines or fuel cells, burned to yield heat, or processed into a fuel.

26 Claims, 8 Drawing Sheets

(51) Int. Cl.
*C10J 3/72* (2006.01)
*B09B 3/00* (2006.01)
*C01B 3/36* (2006.01)
*C01B 3/38* (2006.01)
*C10G 2/00* (2006.01)
*C10J 3/02* (2006.01)
*C10K 3/00* (2006.01)
*C10K 1/02* (2006.01)
*C10K 3/02* (2006.01)

(52) U.S. Cl.
CPC . C10J 3/02 (2013.01); C10K 3/008 (2013.01); C10K 1/024 (2013.01); C10K 3/023 (2013.01); *C01B 2203/0244* (2013.01); *C01B 2203/0255* (2013.01); *C01B 2203/0261* (2013.01); *C01B 2203/0495* (2013.01); *C01B 2203/06* (2013.01); *C01B 2203/062* (2013.01); *C01B 2203/066* (2013.01); *C01B 2203/0861* (2013.01); *C01B 2203/0883* (2013.01); *C01B 2203/142* (2013.01); *C01B 2203/1614* (2013.01); *C01B 2203/169* (2013.01); *C10J 2300/0916* (2013.01); *C10J 2300/0959* (2013.01); *C10J 2300/0976* (2013.01); *C10J 2300/1606* (2013.01); *C10J 2300/1637* (2013.01); *C10J 2300/1646* (2013.01); *C10J 2300/1671* (2013.01); *C10J 2300/1884* (2013.01); *Y02E 50/32* (2013.01)

USPC ............... 429/426; 429/416; 48/87; 48/197 R

(56) References Cited

U.S. PATENT DOCUMENTS

| | | | |
|---|---|---|---|
| 4,909,727 A * | 3/1990 | Khinkis | 431/10 |
| 4,987,115 A | 1/1991 | Michel-Kim | |
| 6,084,139 A * | 7/2000 | Van Der Giessen et al. | 585/240 |
| 6,120,567 A | 9/2000 | Cordell et al. | |
| 6,506,510 B1 * | 1/2003 | Sioui et al. | 429/411 |
| 2004/0107638 A1 | 6/2004 | Graham et al. | |
| 2007/0266914 A1 | 11/2007 | Graham et al. | |
| 2007/0284453 A1 | 12/2007 | Tsangaris et al. | |
| 2007/0289216 A1 * | 12/2007 | Tsangaris et al. | 48/197 R |
| 2008/0244976 A1 | 10/2008 | Paisley | |
| 2008/0277265 A1 | 11/2008 | Tsangaris et al. | |

FOREIGN PATENT DOCUMENTS

| | | |
|---|---|---|
| CA | 2486318 A1 | 5/2005 |
| EP | 0512305 A1 | 11/1992 |
| EP | 0801218 B1 | 7/2001 |
| EP | 1194508 B1 | 10/2004 |
| WO | 02/051965 A1 | 7/2002 |
| WO | 2005113732 A1 | 12/2005 |
| WO | WO 2007048058 A2 * | 4/2007 |
| WO | 2007136786 A1 | 11/2007 |
| WO | 2008011213 A2 | 1/2008 |

* cited by examiner

US 8,936,886 B2

METHOD FOR GENERATING SYNGAS FROM BIOMASS INCLUDING TRANSFER OF HEAT FROM THERMAL CRACKING TO UPSTREAM SYNGAS

CROSS REFERENCE TO RELATED APPLICATIONS

This application claims priority from U.S. Patent Application No. 61/075,685 filed on 25 Jun. 2008 entitled GENERATING CLEAN SYNGAS FROM BIOMASS and U.S. Patent Application No. 61/098,643 filed on 19 Sep. 2008 and entitled GENERATING CLEAN SYNGAS FROM BIOMASS. For purposes of the United States, this application claims the benefit of Application Nos. 61/075,685 and 61/098,643 under 35 U.S.C. §119.

TECHNICAL FIELD

The invention relates to generating syngas from biomass. Embodiments of the invention provide methods and apparatus for generating syngas from biomass. The methods and apparatus can provide for cracking of certain fractions within the syngas. Syngas so produced may be used in a wide range of applications.

BACKGROUND

Combustible gases can be generated by thermo-chemical conversion of biomass. Biomass may be any suitable carbon-containing fuel. Non-limiting examples of biomass include: wood (in any suitable form including sawdust, shavings, pellets, chips, other wood residue and the like), municipal waste, sewage, coal, bitumen, fossil fuels, food waste, plant matter or the like. Combustible gases may be liberated from biomass by heating the biomass in an oxygen-reduced atmosphere. The heating may be done by partially oxidizing the biomass or by way of a separate heat source.

The heating causes the biomass to release combustible gases (sometimes called "syngas", "synthesis gas", "producer gas", or "product gas").

Combustible gases produced from biomass may be used for various applications. For example, the gases may be burned to generate heat, processed to make synthetic fuels (the synthetic fuels may comprise gaseous, liquid or solid fuels), used to run an engine, used as a fuel for a fuel cell, used as a fuel to run a turbine, or the like.

Gases liberated from biomass may include fractions, such as tars and heavier hydrocarbons, that can condense in ducts and other equipment. This can cause significant operational and maintenance problems.

There is a need for practical and energy-efficient methods and apparatus for producing clean syngas from biomass.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
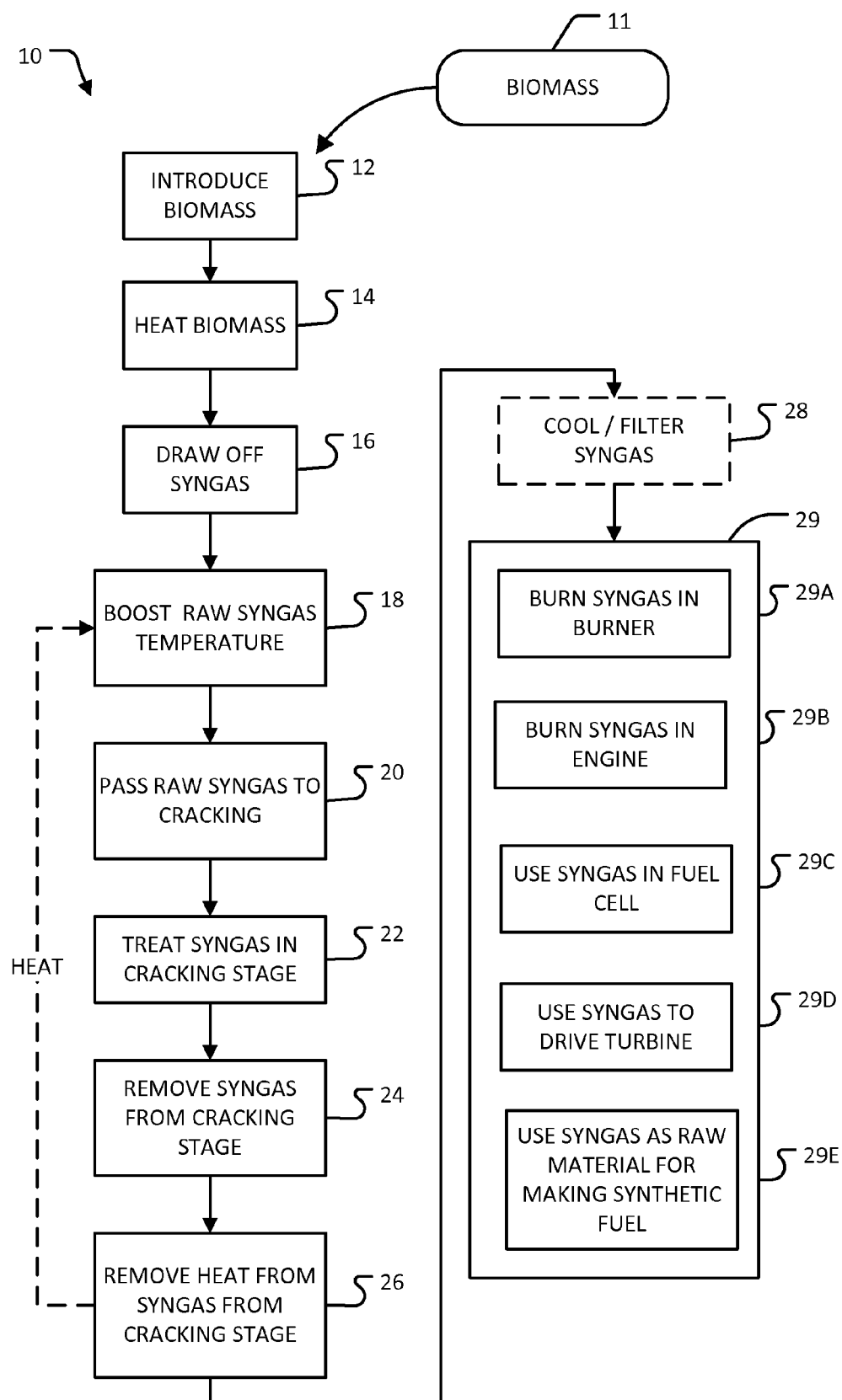
FIG. 1 is a flow chart illustrating a method according to an example embodiment of the invention.

FIG. 1 illustrates a method 10 for gasifying biomass according to an example embodiment of the invention. At block 12 method 10 introduces biomass 11 into a chamber in which the biomass can be heated. The biomass may comprise any suitable type of biomass. In an example embodiment, the biomass comprises wood and block 12 comprises placing the wood into a gasification chamber. In some embodiments the wood is supplied in the form of small pieces. In some embodiments the small pieces are pieces up to about 1 or 2 inches (about 25 to 50 mm) in size. In some embodiments, the small pieces are inhomogeneous pieces ranging from ⅛ inch to about 3 or 4 inches (about ½ mm to about 10 cm) in size. In some embodiments, the introduction of biomass in block 12 is performed substantially continuously. In other embodiments the introduction of biomass is performed intermittently (e.g. periodically, on demand, or the like).

In some embodiments block 12 comprises introducing the biomass upwardly through an opening in a floor of a gasification chamber. In such embodiments the biomass may form a heap on the floor of the gasification chamber.

In block 14 the biomass is gasified by raising the biomass to an elevated temperature under reduced oxygen conditions to produce raw syngas. In some embodiments the biomass is heated by performing partial oxidation of the biomass. In such embodiments, air or another oxygen-containing gas may be introduced into the gasification chamber in an amount sufficient to permit partial oxidation of the biomass. In other embodiments the biomass is heated by applying heat from an external source to pyrolize the biomass.

In some embodiments a temperature of the biomass is maintained at a temperature below a temperature at which ash from the biomass would melt to yield slag. The melting point of the ash from some types of biomass is in the range of approximately 2100° F. to about 2200° F. For example, in some embodiments the temperature of the biomass is prevented from exceeding about 1800° F. in block 14. Temperature of the biomass may be controlled by controlling a concentration of oxygen in air or other gas being introduced into the biomass (e.g. blast air).

In block 16 the raw syngas is drawn off. In some embodiments the raw syngas is drawn off through a duct connected to receive syngas from a gasification chamber in which block 14 is performed. In some embodiments the temperature of the raw syngas is lower than 900° F. (about 480° C.) at the point where it exits the gasification chamber. In some embodiments the temperature of the raw syngas is in the range of 300° F. (about 150° C.) up to about 1000° F. (about 540° C.) at the point where it exits the gasification chamber.

In block 18 the temperature of the raw syngas is boosted. In some embodiments, block 18 comprises heating the syngas with heat extracted from the syngas at a downstream location. In some embodiments block 18 comprises boosting a temperature of the raw syngas by at least 800° F. (about 430° C.). In some embodiments block 18 comprises boosting a temperature of the raw syngas by 1000° F. (about 540° C.) or more.

In some embodiments, the heated raw syngas has a temperature of at least 1600° F. (about 870° C.). In some embodiments, a temperature of the heated raw syngas is at least about 1200° F. (about 650° C.). In some embodiments a temperature of the heated raw syngas is at least about 1300° F. (about 700° C.).

In block 20 the heated raw syngas is passed to a cracking stage.

In block 22 the raw syngas is treated in the cracking stage. Conditions in the cracking stage promote the breakdown of heavy or tar fractions within the raw syngas. Tars and/or other heavier hydrocarbons present in the syngas may be broken down in the cracking stage. The cracking stage may facilitate breakdown of such fractions by providing oxidants that promote breakdown of the condensing fractions at the temperature at which the cracking stage is operated. The cracking stage may also or alternatively facilitate breakdown of such fractions by providing energy from a plasma torch to promote breakdown of the condensing fractions at the temperature at which the cracking stage is operated. The cracking stage may additionally include one or more of:

one or more catalysts; and, injection of steam or other chemicals that combine with carbon to avoid or reduce soot formation.

In some embodiments, a temperature of the syngas in the thermal cracking stage is at least 1600° F. (about 870° C.). Cracking stages in some example embodiments operate at temperatures in the range of about 1600° F. (about 870° C.) to about 2100° F. (about 1150° C.).

In some embodiments, steam is injected into the syngas in or upstream from the cracking stage. Introduction of steam can reduce soot formation. Steam can react with tar, which could otherwise form soot particles, to form carbon monoxide.

Where block 22 involves mixing the syngas with an oxidant, the oxidant may be preheated. In some embodiments, preheating the oxidant comprises heating the oxidant with heat extracted from the syngas at downstream location. The oxidant may, for example, comprise oxygen, ambient air, or mixtures thereof with one another and/or with other gases such as steam or the like.

As a result of the incoming raw syngas being preheated, suitable temperatures for thermal cracking may be maintained in cracking block 22 with a reduced requirement for heat to be generated in block 22 or a reduced requirement for energy to be otherwise supplied to the syngas in block 22 or both. Where heat is generated in block 22 by exothermic oxidation of syngas, desired temperatures may be reached with a reduced fraction of stoichiometric air (oxidant) introduced into the cracking stage. In some embodiments, the incremental equivalence ratio in the cracking stage is less than 0.15. In some embodiments the incremental equivalence ratio in thermal cracking block 22 is in the range of 0.10-0.15.

In some embodiments, thermal cracking comprises using a plasma torch to provide some or all of the energy required to thermally crack the incoming raw syngas. Any suitable type of plasma torch may be used. For example, a plasma arc may be used to heat a small amount of inert gas, which may then be blown into the cracking chamber. Alternatively, a reducing gas or an oxidizing gas may be introduced by way of the plasma torch. Where heat is generated in block 22 by operation of a plasma torch, the desired temperature may be reached with a reduced amount of energy applied to the plasma torch as a result of the incoming raw syngas being preheated. In some embodiments, complete cracking of the syngas may be achieved in the absence of oxygen and/or water. However, the presence of oxygen and/or water may prevent or reduce the formation of soot as a product of the cracking process. In some embodiments, heat may be generated in block 22 by a combination of the operation of a plasma torch and the exothermic oxidation of syngas in the presence of a sub-stoichiometric amount of oxidant. In some such embodiments, the incremental equivalence ratio in the cracking stage may be less than 0.15, and may be less than 0.10.

In some embodiments, a temperature rise experienced by the syngas upon entering the thermal cracking stage is about 1000° F. (about 550° C.) or less. This temperature rise can be smaller in some cases, for example 500° F. (about 260° C.) or less or 400° F. (about 200° C.) or less in some embodiments. In an example embodiment, heated syngas enters the cracking stage at a temperature of about 1200° F. (about 650° C.) and reaches a temperature of about 2100° F. (about 1150° C.) in the cracking stage. In this example embodiment, the temperature rise experienced by the syngas upon entering the thermal cracking stage is about 900° F. (about 480° C.). In another example embodiment, heated syngas enters the cracking stage at a temperature of about 1300° F. (about 700° C.) and reaches a temperature of about 2000° F. (about 1100° C.) in the cracking stage so that the temperature rise in the cracking stage is about 700° F. (about 370° C.).

The cracking stage may comprise a stage in which syngas passes into and through a volume within a thermal cracking chamber. The thermal cracking chamber may comprise a refractory-lined vessel. In an example embodiment, the thermal cracking chamber comprises a cylindrical chamber having axial inlet and outlet ports and oxidant ports located in an area near to the inlet port. In some embodiments the oxidant ports enter the thermal cracking chamber radially. In some embodiments there are two or more sets of oxidant ports, each set may comprise a plurality of oxidant ports spaced circumferentially around the thermal cracking chamber.

In some embodiments, the thermal cracking chamber may include a plasma torch. In some embodiments that include a plasma torch the oxidant ports are omitted. Some embodiments that include a plasma torch include a pathway for adding steam into or upstream from the thermal cracking chamber. Oxidant may be introduced into the cracking chamber through oxidant ports, if present, and/or through the plasma torch.

In some embodiments the thermal cracking stage is performed in a thermal cracking chamber that is in a separate structure from the gasification chamber.

In block 24 the syngas passes out of the cracking stage.

In block 26 some heat is removed from the syngas. Block 26 may comprise passing the syngas through a heat exchanger, for example. In some embodiments heat extracted at block 26 is used to boost the temperature of raw syngas in block 18. In some embodiments heat extracted at block 26 is used to boost the temperature of oxidant introduced in block 22.

In block 28 the syngas is optionally further cooled and/or filtered.

In block 29 the syngas is provided as a fuel to one or more of:

a burner (block 29A)

an engine (block 29B)

a fuel cell (block 29C)

a turbine (block 29D)

a process for making synthetic fuel (block 29E)

etc.

Figure 2:
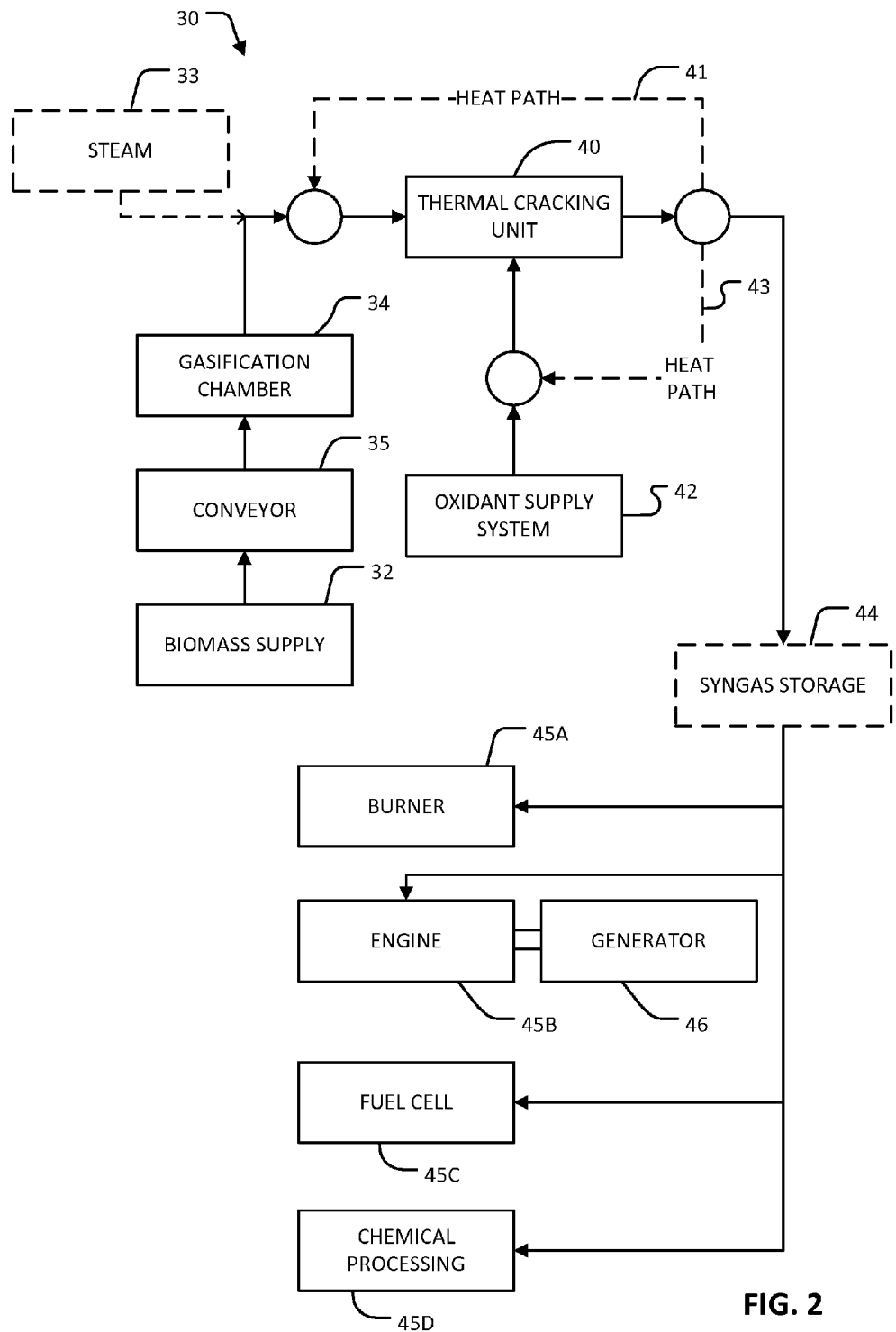
FIG. 2 is a block diagram illustrating an apparatus according to an example schematic embodiment of the invention.

FIG. 2 shows schematically apparatus 30 according to an example embodiment of the invention. Apparatus 30 comprises a biomass supply 32 and a gasification chamber 34. A conveyor 35 carries biomass from biomass supply 32 to gasification chamber 34. Syngas is generated within gasification chamber 34 by heating biomass, either indirectly or by partial oxidation of the biomass.

A thermal cracking unit 40 receives raw syngas from gasifier chamber 34. Thermal cracking unit 40 comprises a chamber within which the syngas is maintained at a temperature sufficient to break down tars, heavier hydrocarbons and the like. A controlled amount of an oxidant (for example, air or another gas containing oxygen) is introduced into thermal cracking unit 40. Water, which may be in the form of steam, may be introduced into or upstream from thermal cracking unit 40. Injection of water may be unnecessary in cases where sufficient water is already present (e.g. in cases where biomass from supply 32 has a sufficiently-high moisture content). FIG. 2 shows an example source of steam 33 connected to inject steam into the syngas upstream from cracking unit 40, where the syngas is thermally cracked.

A heat path 41 carries heat from syngas exiting thermal cracking unit 40 to raw syngas that has not yet been processed in thermal cracking unit 40.

In the illustrated embodiment, an oxidant supply system 42 is connected to supply air or another oxidant into thermal cracking unit 40. A second heat path 43 carries heat from syngas exiting thermal cracking unit 40 to oxidant being supplied to thermal cracking unit 40 by oxidant supply system 42.

Syngas from thermal cracking unit 40 is delivered to one or more of:

A burner 45A.

An engine 45B. Engine 45B may be an internal combustion engine or a turbine for example. In some embodiments engine 45B drives a generator 46 to generate electrical power.

A fuel cell 45C.

A chemical process 45D. Chemical process 45D may take syngas as a raw material and process the syngas into a synthetic fuel.

A storage tank 44 is optionally provided.

Figure 6:
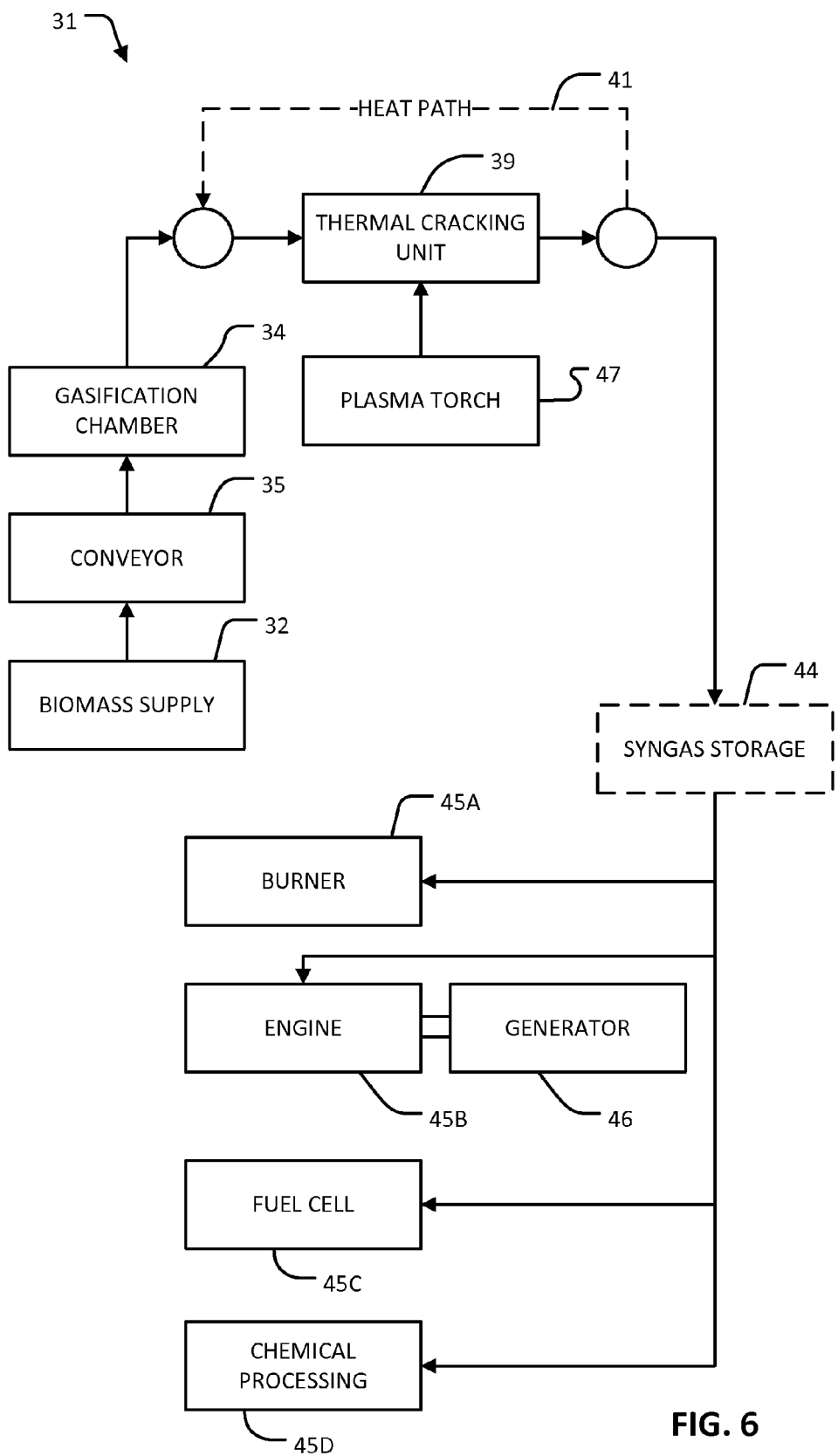
FIG. 6 is a block diagram illustrating an apparatus according to another example embodiment of the invention.

FIG. 6 shows schematically apparatus 31 according to a further example embodiment of the invention. Apparatus 31 is similar to apparatus 30, except that a plasma torch 47 is provided to supply heat to syngas within a thermal cracking unit 39 to maintain syngas in thermal cracking unit 39 at a temperature sufficient to break down tars, heavier hydrocarbons and the like. Apparatus 31 includes many of the same components as apparatus 30, which have like reference numerals in FIG. 6. Additionally, apparatus 31 is illustrated without an oxidant supply system. However, in some embodiments, apparatus 31 may include an oxidant supply system similar to oxidant supply system 42 for thermal cracking unit 39. As with apparatus 30, water, optionally in the form of steam, may be introduced into or upstream of thermal cracking unit 39.

Figure 3:
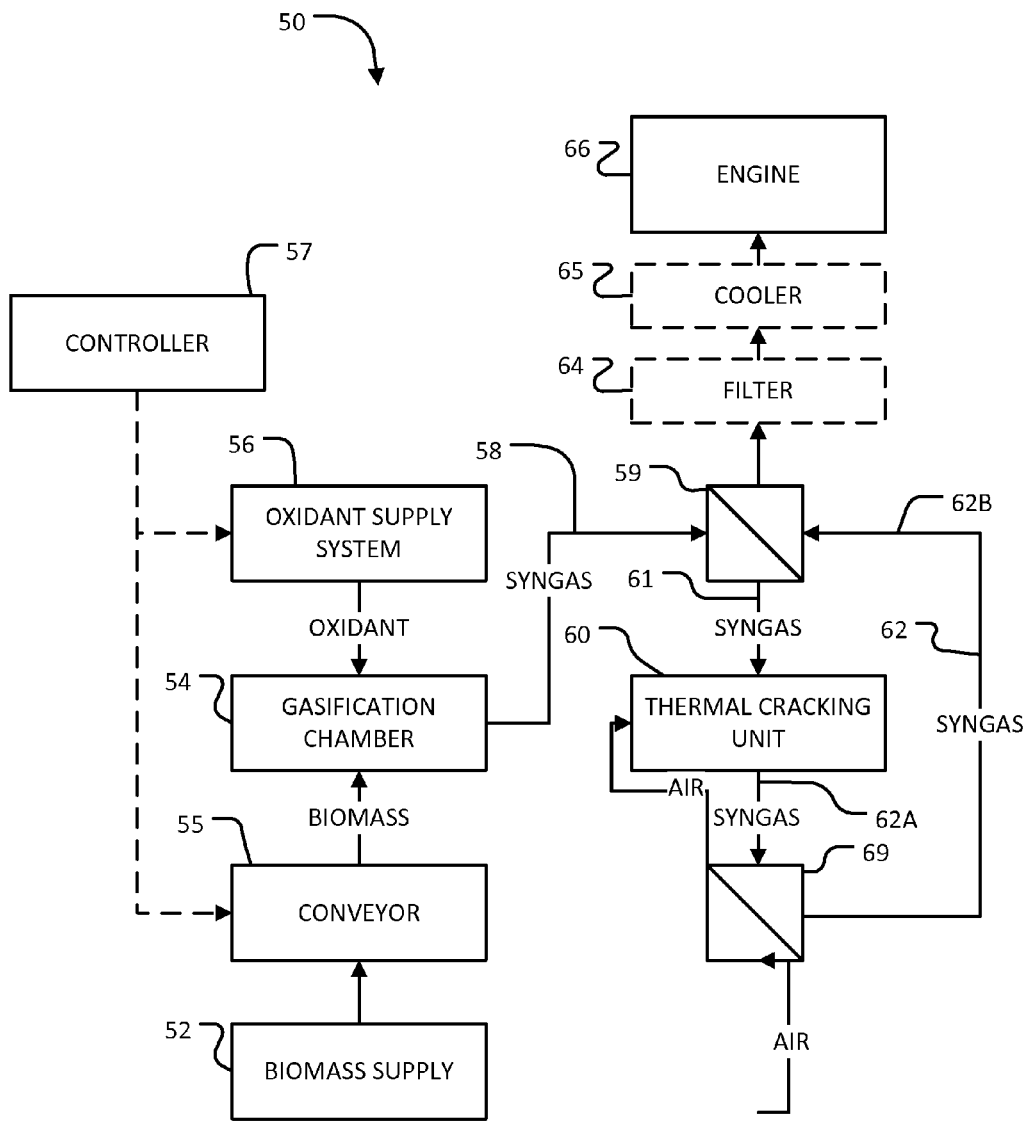
FIG. 3 is a block diagram illustrating an apparatus according to another example embodiment of the invention.

FIG. 3 shows a gasification apparatus 50 according to an example embodiment of the invention. Apparatus 50 comprises a biomass supply 52 and a gasification chamber 54. A conveyor 55 carries biomass from biomass supply 52 to gasification chamber 54.

In the illustrated embodiment, the biomass is heated (at least in part) by partial oxidation of the biomass in a controlled atmosphere within gasification chamber 54. An oxidant supply system 56 supplies oxidant (which may, for example, comprise air, a mixture of air and/or oxygen with steam and/or flue gas, or the like) to gasification chamber 54. A controller 57 regulates operation of conveyor 55 and oxidant supply system 56 to maintain proper conditions for gasification of the biomass. In alternative embodiments, other means, such as an indirect heater, may be provided for heating biomass within gasifier chamber 54.

A duct 58 carries raw syngas from gasification chamber 54 to the cold side (i.e., second side) of a first heat exchanger 59. The temperature of the raw syngas is increased in first heat exchanger 59. The heated raw syngas then passes through a duct 61 to a thermal cracking unit 60. Thermal cracking unit 60 may be constructed and operated in substantially the same manner as thermal cracking unit 40 of FIG. 2, or as thermal cracking unit 39 of FIG. 6, for example.

First heat exchanger 59 may comprise, for example, a gas-gas heat exchanger (such as a shell-and-tube or plate heat exchanger) or a heat exchanger in which an intermediate circulating heat exchange medium carries heat to the incoming syngas. Apparatus 50 of FIG. 3 includes an optional second heat exchanger 69.

Syngas exits thermal cracking unit 60 into duct 62 which eventually connects to the hot side (i.e., first side) of first heat exchanger 59. In the illustrated embodiment, duct 62 has a first part 62A that carries syngas from thermal cracking unit 60 to a hot side of second heat exchanger 69 and a second part 62B that carries the hot syngas from second heat exchanger 69 to the hot side of first heat exchanger 59. In first heat exchanger 59 heat from the hot syngas that has exited thermal cracking unit 60 is transferred to raw syngas that is being moved from duct 58 into thermal cracking unit 60 through first heat exchanger 59.

Syngas exiting the hot side of first heat exchanger 59 is delivered to an engine 66 (or other end use or storage) by way of a filter 64 and a cooler 65. When the syngas is used as fuel for an engine it is usually desirable that the syngas be at a temperature of about 110° F. (about 45° C.) or less at the point where it is taken into the engine.

In the illustrated embodiment, air or another oxidant is delivered to thermal cracking unit 60. The air is conveyed through the cold side of a second heat exchanger 69 before it enters thermal cracking unit 60. Hot syngas that has exited thermal cracking unit 60 passes through the hot side of second heat exchanger 69.

In the illustrated embodiment, the hot syngas that has exited thermal cracking unit 60 passes first through the hot side of second heat exchanger 69 and then through the hot side of first heat exchanger 59. This order is not mandatory. In other embodiments, the syngas passes first through first heat exchanger 59 and then through second heat exchanger 69. In still other embodiments the syngas is divided into streams that pass through first heat exchanger 59 and second heat exchanger 69 in parallel.

In apparatus 50 first heat exchanger 59 provides a heat path that carries heat from syngas exiting thermal cracking unit 60 to raw syngas that has not yet been processed in thermal cracking unit 60.

In apparatus 50, gasification chamber 54 may take any of a variety of forms. In some embodiments, gasification chamber 54 is an updraft gasification chamber and raw syngas is drawn off at a location that is above the biomass from which the syngas is being generated. In some embodiments gasification chamber 54 comprises a bottom-fed gasification chamber.

Non-limiting examples of bottom-fed gasification chambers of types that may be used in apparatus 50 are described in the following patents and patent applications:

U.S. Pat. No. 6,120,567
US 2004/0107638
PCT/US2007/011965
CA 1380910
CA 2486318.

Other types of gasification chamber may be provided for the generation of raw syngas. A wide range of gasification chambers useful for gasifying biomass is described in the technical literature in the field of biomass gasification.

Figure 4:
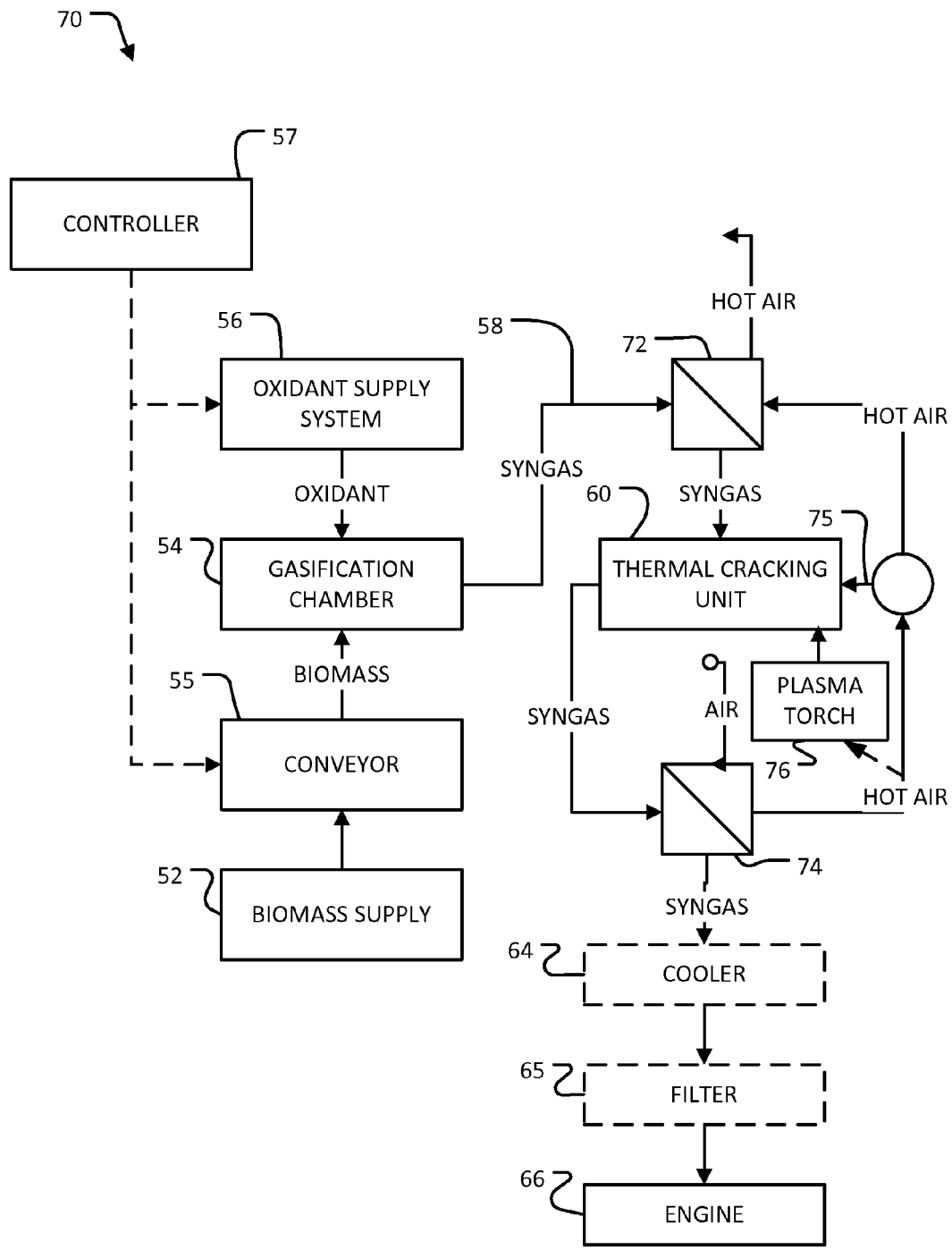
FIG. 4 is a block diagram illustrating an apparatus according to another example embodiment of the invention.

FIG. 4 shows apparatus 70 according to an alternative embodiment. The apparatus of FIGS. 3 and 4 have a number of common components. These components have the same reference numbers in FIG. 4 as in FIG. 3. Apparatus 70 optionally includes a plasma torch 76 to heat syngas in thermal cracking unit 60. Apparatus 70 comprises a first heat exchanger 72 and a second heat exchanger 74. The cold side of first heat exchanger 72 is in the path taken by raw syngas flowing from gasifier chamber 54 to thermal cracking unit 60. The hot side of second heat exchanger 74 is in the path taken by hot syngas that has exited thermal cracking unit 60. Air passing through the cold side of second heat exchanger 74 receives heat from the hot syngas on the hot side of second heat exchanger 74. The air is heated to a temperature in excess of 1600° F. (about 870° C.) for example. Some of the heated air is provided as an oxidant to thermal cracking unit 60 by way of path 75. Some of the heated air may optionally be provided to plasma torch 76. The rest of the heated air passes through the hot side of first heat exchanger 72. In doing so, heat is transferred from the hot air to the raw syngas passing through the cold side of first heat exchanger 72. The hot air (now at a reduced temperature) may be exhausted, applied to drying or preheating biomass, applied for other heating functions, or the like.

Blowers, adjustable valves and the like may be provided to maintain suitable flow of air, syngas and other fluids as required. These components are understood by those of skill in the art and are not illustrated here to avoid obscuring the invention.

Figure 4A:
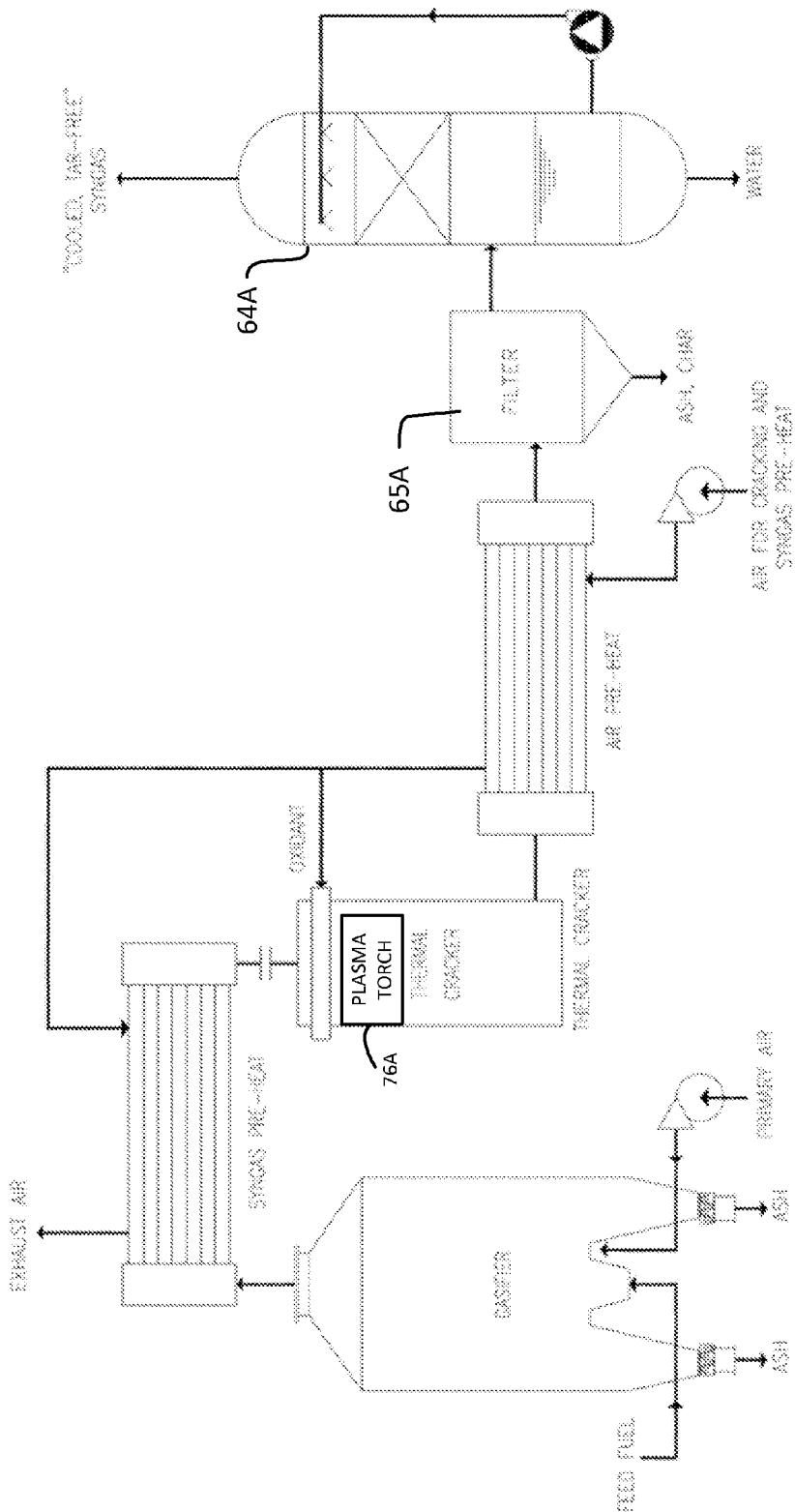
FIG. 4A is a process diagram illustrating schematically an apparatus according to a further embodiment of the invention.

FIG. 4A is a process diagram illustrating apparatus for producing clean syngas that is similar to that depicted in FIG. 4. FIG. 4A shows a cooler 64A that comprises a condenser to remove water vapor and a filter 65A. In the illustrated embodiment, a plasma torch 76A is provided in the thermal cracker to provide energy to heat the syngas at the cracking stage.

Figure 5:
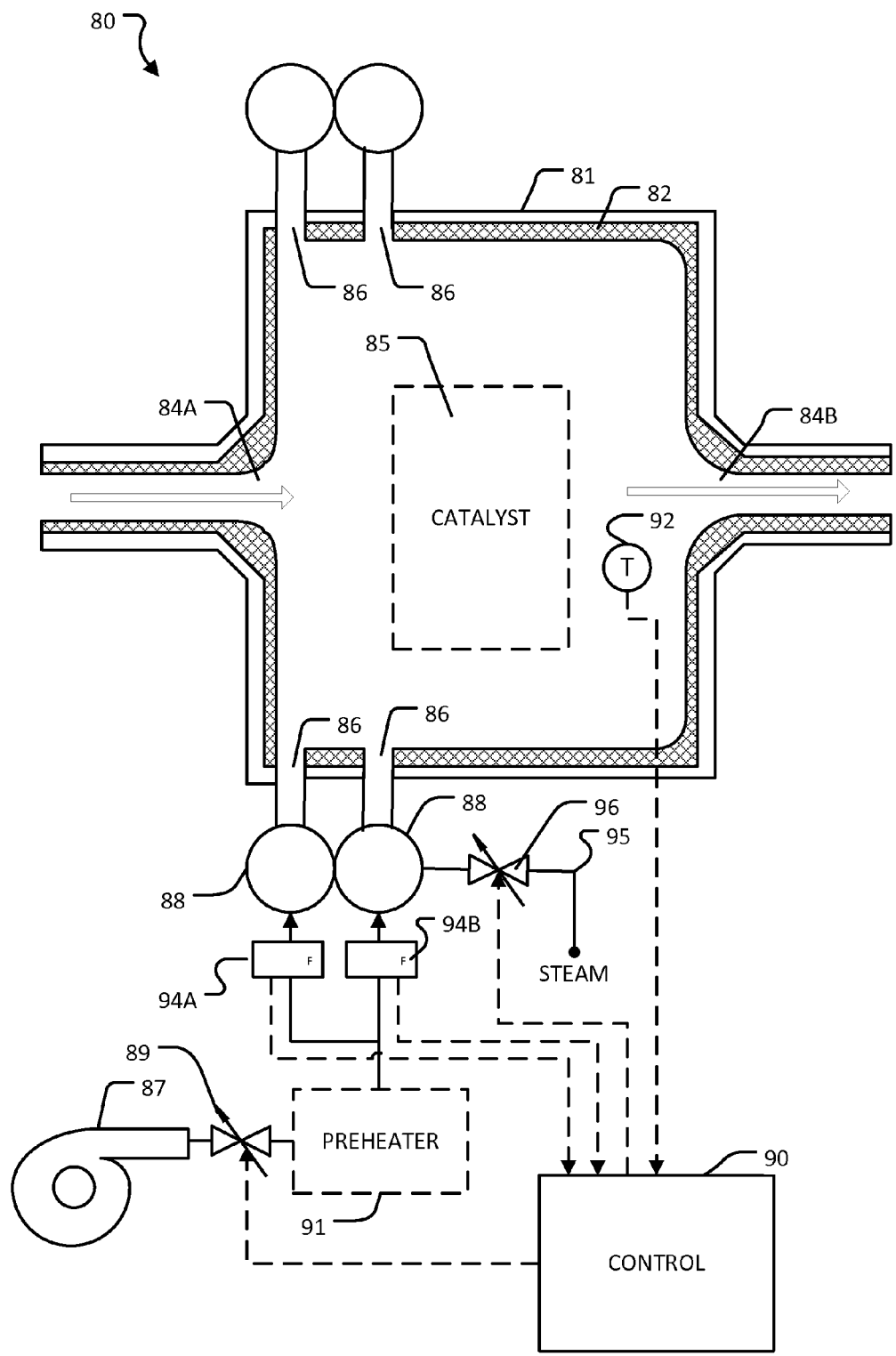
FIG. 5 is a schematic cross-sectional illustration of an example thermal cracking unit and associated systems.

FIG. 5 shows schematically a thermal cracking unit 80 comprising a vessel 81 lined with a layer 82 of refractory material. A thermal cracking unit like thermal cracking unit 80 may be used in any of the embodiments described above (although this is not mandatory—other styles of thermal cracking unit may be used).

Syngas can enter vessel 81 through an inlet 84A and, after processing in thermal cracking unit 80 can exit at outlet port 84B. A catalyst structure 85 is optionally provided in vessel 81. Oxidant is introduced into vessel 81 by way of two rings of radially-oriented ports 86. Air is supplied to ports 86 by a blower 87 that feeds manifolds 88 by way of a control valve 89. FIG. 5 shows an optional preheater 91 (which may comprise a heat exchanger) that heats air before the air is introduced into thermal cracking unit 80. Preheater 91, if present, may be provided at any suitable location in the path taken by air being delivered into thermal cracking unit 80.

In the embodiment illustrated in FIG. 5, a controller 90 controls the degree of opening of valve 89 in response to signals from at least one temperature sensor 92 that measures a temperature in thermal cracking unit 80 and mass flow sensors 94A and 94B that monitor the mass flow of air into vessel 81. Controller 90 may comprise a suitable programmable or hard-wired process controller, a programmed computer control system, or the like. Controller 90 controls the influx of air into vessel 81 to maintain a desired temperature within vessel 81.

FIG. 5 shows an optional steam inlet line 95 connected to supply steam into vessel 81 by way of a manifold 88. The influx of steam is controlled by a valve 96 operated in response to signals from controller 90. In alternative embodiments that include steam injection, steam is injected at other locations into and/or upstream from thermal cracking unit 80.

Figure 7:
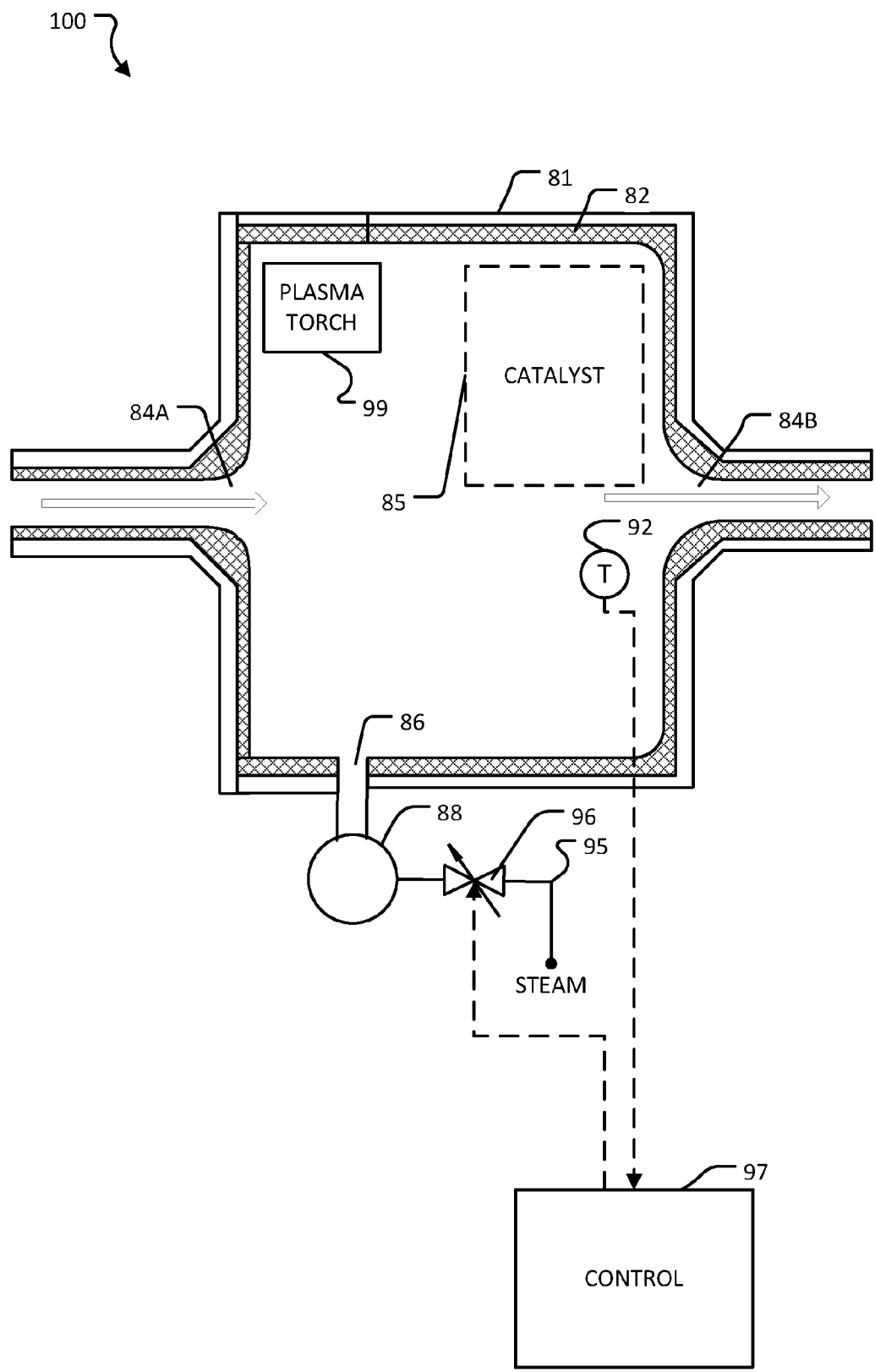
FIG. 7 is a schematic cross-sectional illustration of an example thermal cracking unit and associated systems.

FIG. 7 shows schematically a thermal cracking unit 100. Thermal cracking unit 100 includes many of the same components as thermal cracking unit 80, and these components are referred to by the same reference numerals as in FIG. 5. A thermal cracking unit 100 may be used in any of the embodiments described above.

In the illustrated thermal cracking unit 100, syngas enters vessel 81 through inlet 84A and exits through outlet port 84B after it has been processed in thermal cracking unit 100. A plasma torch 99 and an optional catalyst structure 85 are provided in vessel 81. Plasma torch 99 is operated to heat syngas within thermal cracking unit 100, and thereby maintain the syngas at a temperature sufficient to break down tars, heavier hydrocarbons and the like. A controller 97, which may be any suitable programmable or hard-wired process controller, a programmed computer control system, or the like, may be used to regulate the operation of plasma torch 99 in response to temperature sensor 92. In some embodiments, thermal cracking unit 100 may further include ports for introducing oxidant into vessel 81. In such case, a suitable controller may likewise be used to regulate both the influx of air into vessel 81 (as described with reference to thermal cracking unit 80) and the operation of plasma torch 99, to maintain a desired temperature within the vessel 81.

The embodiment illustrated in FIG. 7 also includes optional steam inlet 95 connected to supply steam into vessel 81 through manifold 88 and port 86. Valve 96 controls the influx of steam into vessel 81 in response to signals from controller 97. Alternatively, steam may be injected at other locations into and/or upstream from thermal cracking unit 100.

Where a component (e.g. a chamber, duct, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, features from any of the embodiments described herein may be combined with features of other embodiments described herein to provide further embodiments.

What is claimed is:
1. A method for producing syngas, the method comprising:
heating biomass;
collecting raw syngas released from the biomass;

subsequently heating the raw syngas; and, subjecting the heated raw syngas to thermal cracking, wherein heating the raw syngas comprises transferring heat from syngas that has been subjected to thermal cracking to the raw syngas thereby increasing a temperature of the raw syngas and, wherein transferring heat from the syngas that has been subjected to thermal cracking to the raw syngas comprises transferring heat from the syngas that has been subjected to thermal cracking to a heat exchange medium and transferring heat from the heat exchange medium to the raw syngas.

2. A method according to claim 1 wherein transferring heat from the syngas that has been subjected to thermal cracking to the raw syngas comprises passing the syngas that has been subjected to thermal cracking through a first side of a heat exchanger and passing the raw syngas through a second side of the heat exchanger.

3. A method according to claim 1 wherein heating the biomass is performed in a gasification chamber and subjecting the raw syngas to thermal cracking is performed in a chamber separate from the gasification chamber.

4. A method according claim 3 wherein heating the raw syngas comprises increasing the temperature of the raw syngas by at least 1000° F.

5. A method according to claim 4 wherein, prior to heating the raw syngas, the raw syngas has the temperature not exceeding 1000° F.

6. A method according to claim 5 wherein, prior to heating the raw syngas, the raw syngas has the temperature in the range of 300° F. to 1000° F.

7. A method according to claim 3 wherein, after heating the raw syngas and before subjecting the raw syngas to thermal cracking, the raw syngas has the temperature of at least 1300° F.

8. A method according to claim 7 comprising, while subjecting the raw syngas to thermal cracking, raising the temperature of the heated raw syngas by an amount not exceeding 1000° F.

9. A method according to claim 3 wherein heating the biomass comprises maintaining a temperature of the biomass below a melting temperature of ash from the biomass.

10. A method according to claim 9 wherein heating the biomass comprises maintaining the temperature of the biomass in a temperature range not exceeding 1800° F.

11. A method according to claim 1 wherein subjecting the heated raw syngas to thermal cracking comprises heating the syngas with a plasma torch.

12. A method according to claim 1 wherein thermally cracking the syngas comprises injecting steam into the syngas.

13. A method according to claim 12 wherein injecting the steam into the syngas is performed upstream from a location at which thermally cracking the syngas occurs.

14. A method according to claim 1 wherein subjecting the heated raw syngas to thermal cracking comprises maintaining an incremental equivalence ratio not exceeding 0.15.

15. A method according to claim 1 wherein subjecting the heated raw syngas to thermal cracking comprises maintaining an incremental equivalence ratio in the range of about 0.1 to 0.15.

16. A method according to claim 1 wherein subjecting the heated raw syngas to thermal cracking comprises adding oxidant to the syngas.

17. A method according to claim 16 comprising pre-heating the oxidant prior to adding the oxidant to the syngas.

18. A method according to claim 17 wherein pre-heating the oxidant comprises transferring heat from the syngas that has been subjected to thermal cracking to the oxidant.

19. A method according to claim 16 wherein subjecting the heated raw syngas to thermal cracking comprises maintaining an incremental equivalence ratio not exceeding 0.15.

20. A method according to claim 19 comprising maintaining the incremental equivalence ratio in the range of about 0.1 to 0.15.

21. A method according to claim 20 wherein maintaining the incremental equivalence ratio comprises controlling the addition of the oxidant to the syngas.

22. A method according to claim 1 comprising running an engine on the syngas that has been subjected to thermal cracking.

23. A method according to claim 22 comprising driving a generator with the engine to generate electricity.

24. A method according to claim 1 comprising supplying to a fuel cell a fuel comprising the syngas.

25. A method according to claim 1 comprising processing the syngas to yield a synthetic fuel.

26. A method according to claim 1 wherein heating the biomass comprises applying heat from an external source to pyrolize the biomass.

* * * * *